United States Patent [19]

Leduc

[11] Patent Number: 4,956,395
[45] Date of Patent: Sep. 11, 1990

[54] STYRENIC FOAM BLOWING AGENT COMPOSITION

[75] Inventor: Edward C. Leduc, Marietta, Ga.

[73] Assignee: Amoco Corporation, Chicago, Ill.

[21] Appl. No.: 466,977

[22] Filed: Jan. 18, 1990

[51] Int. Cl.$^5$ ................................................ C08J 9/14
[52] U.S. Cl. ........................................ 521/79; 264/53;
264/DIG. 5; 521/98; 521/146; 521/910
[58] Field of Search .................... 521/98, 146, 910;
264/53, DIG. 5

[56] References Cited

U.S. PATENT DOCUMENTS

| | | | |
|---|---|---|---|
| 3,640,916 | 2/1972 | Dill | 521/149 |
| 3,960,792 | 6/1976 | Nakamura | 521/146 |
| 4,308,352 | 12/1981 | Knons | 521/79 |
| 4,438,224 | 3/1984 | Suh | 521/147 |
| 4,451,417 | 5/1984 | Akiyama et al. | 521/146 |
| 4,528,300 | 7/1985 | Park | 521/98 |
| 4,640,933 | 2/1987 | Park | 521/79 |
| 4,771,080 | 9/1988 | Ibuki et al. | 521/145 |

*Primary Examiner*—Morton Foelak
*Attorney, Agent, or Firm*—William E. Murray; William H. Magidson; Ralph C. Medhurst

[57] ABSTRACT

The invention comprises a blowing agent composition useful in the production of insulating styrenic foams comprising ethylchoride, propane and a halogenated ethane selected from the group consisting of 1,1,1-trifluoro-2-fluoroethane, 1-chloro-1,1-difluoro-2,2,2-trifluoroethane 1-chloro-1,1-difluoroethane (FC-142b) and mixtures thereof. The invention further comprises a method to produce dimensionally stable insulating styrenic foams using the blowing agent composition. The blowing agent composition has a significantly reduced ozone reactivity potential compared to previous commercial styrenic foam blowing agents.

9 Claims, No Drawings

STYRENIC FOAM BLOWING AGENT COMPOSITION

FIELD OF THE INVENTION

This invention relates to a blowing agent composition and method used in the production of a styrenic foam.

BACKGROUND OF THE INVENTION

Thermoplastic foams made from styrenic polymers, such as polystyrene, have found extensive use, particularly as insulating materials. Generally, insulating styrenic foams are produced in thicknesses greater than one-half inch. The insulating value of such foams is measured in terms of heat conduction resistance or R-value, per one inch of foam thickness, and adequate insulating foams typically have R-values of about 5.0 per inch or greater. Styrenic insulating foams to meet government construction standards generally must also be dimensionally stable, i.e., they must have a maximum change in any of length, width or thickness of less than about 2.0 percent when subjected to a 158° F. temperature for 24 hours.

These styrenic foams typically are made by mixing a volatile blowing agent with the styrenic resin under a controlled temperature and pressure sufficient to liquefy and plasticize the resin and to maintain the resin in an unfoamed state, and then extruding the resin-blowing agent mixture through a die into a zone of lower temperature and pressure which results in the formation of the styrenic foam. Blowing agent compositions for styrenic foam production generally are required first to have a system vapor pressure at the melt temperature of the styrenic resin used sufficient to produce acceptable insulating foam, and second to provide sufficient plasticization to the styrenic resin to permit extrusion at commercial production rates. The blowing agent should also not have too great of a plasticizing effect on the styrenic resin, to avoid dimensional instability of the foam.

Presently, production of dimensionally stable, insulating styrenic foams which retain an R-value above 5.0 per inch upon aging, in general requires the use of a blowing agent of certain chlorofluorocarbons, such as dichlorodifluoromethane (Freon-12). Freon-12 has found extensive use with styrenic foams because it meets the vapor pressure and plasticization requirements for a styrenic foam blowing agent. These chlorofluorocarbons are suspected of reacting with ozone after their release into the earth's atmosphere. Thus, alternative styrenic foam blowing agents capable of producing stable, insulating styrenic foams of adequate R-value are very desirable.

Blowing agents for styrenic foams have previously been disclosed. Suh, U.S. Pat. No. 4,438,224 discloses a mixture of certain chlorofluoromethanes and certain lower alcohols. Suh further discusses using a mixture of methylchloride plus chlorofluorocarbons as the blowing agent to produce styrenic foam.

Nakamura, U.S. Pat. No. 3,960,792 discloses a method for producing a styrenic foam using a blowing agent mixture having a specific diffusion rate through the styrenic resin. One particular embodiment disclosed is use of a blowing agent mixture of 30 parts methylchloride, 30 parts neopentane and 40 parts dichlorodifluoromethane. Nakamura also discloses that aliphatic hydrocarbons, including propane, can be used in his method.

Canadian Patent No. 1,086,450, issued Sept. 23, 1980, claims a styrenic foam having specified characteristics, which is produced using a low permeability blowing agent of a specified formula, such as 1-chloro-1,1-difluoroethane (also known as "FC-142b" which for convenience will be used hereafter). The blowing agent is also disclosed as including a mixture of the low permeability blowing agent with at least one of fluorachloromethane, methylchloride, ethylchloride, chlorodifluoramethane, or 1,1-diflouroethane.

Suh, U.S. Pat. No. 4,636,527 discloses a process for the preparation of an alkenyl aromatic foam, such as a polystyrene foam, using a blowing agent mixture comprising about 3 to 45 wt. % carbon dioxide, about 5 to 97 wt. % ethylchloride and from about 0 to 90 wt. % of a fluorocarbon member which is dichlorodifluoromethane, 1-chloro-1,1-difluoroethane or a mixture of the two chlorofluorocarbons.

Akiyama, U.S. Pat. No. 4,451,417, discloses a polystyrene foam extrusion process using as a blowing agent a mixture of 50 to 80 wt. % dichlorodifluoromethane and 20 to 50 wt. % ethylchloride.

Propane has been used commercially as a blowing agent for making thin polystyrene foams having thicknesses less than one-half inch. However, to Applicant's knowledge, propane has not previously been used commercially in production of insulating styrenic foams having thicknesses above about one-half inch.

Blowing agent mixtures have also been used to produce foams from resins other than styrenic resins. For example, Knaus, U.S. Pat. No. 4,308,352 discloses a process for the production of a polysulfone foam using a blowing agent of either a mixture of methylchloride plus ethylchloride plus 1-chloro-1,1-difluoroethane or a mixture of methylchloride plus propane as the blowing agent to produce such a polysulfone foam.

Park, U.S. Pat. No. 4,528,300 discloses a process for producing a polyolefin foam employing a blowing agent comprising 50 to 95 wt. % of FC-142b plus 5 to 50 wt. % of an aliphatic hydrocarbon and/or a halogenated hydrocarbon having a boiling point from 0 to 50° C. Specifically disclosed examples of the aliphatic hydrocarbon and/or halogenated hydrocarbon are ethylchloride and butane. The method disclosed in Park also requires the presence of a stability control agent such as stearamide in the extrusion mass comprising the polyolefin resin and the blowing agent mixture to produce a stable polyolefin foam. Park does not disclose use of his blowing agent to produce styrenic foams and does not disclose the use of propane, which has a boiling point of −42.1° C., in his blowing agent mixture.

Park, U.S. Pat. No. 4,640,933 also discloses a process for producing a polyolefin foam which employs the use of a blowing agent mixture comprising, for example, isobutane plus FC-142b, or isobutane plus ethylchloride, along with the stability control agent disclosed in U.S. Pat No. 4,528,300. Park also does not disclose use of his blowing agent to produce styrenic foams nor does he disclose the use of propane in his blowing agent mixture.

Dill, U.S. Pat. No. 3,640,916 discloses a mixture of butane and FC-142b for use as a propellant. Dill is not directed to the use of such a mixture as a styrenic foam blowing agent.

None of the prior art styrenic foam processes have disclosed a blowing agent system of one or more of a certain group of halogenated ethanes, such as FC-142b, with ethylchloride and propane. It is an object of the invention to provide a styrenic foam blowing agent having a reduced ozone reactivity potential, which comprises such components. It is yet another object to produce a dimensionally stable, insulating styrenic foam having an R-value per inch above about 5 using the new blowing agent. It is also an object to provide an improved insulating styrenic foam extrusion process. Other objects will be apparent from the specification.

I have found that the objects of the invention can be attained by the use of a blowing agent composition comprising: at least one halogenated ethane selected from the group consisting of FC-142b, 1,1,1-trifluoro-2-fluoroethane (hereafter referred to as "Freon 134a"), 1-chloro-1,1-Diflouro-2,2,2,-triflodroethane (hereafter referred to as "Freon 124"); ethyl chloride and propane. Each of the halogenated ethanes is of less ozone reactivity potential than Freon 12. Each provides sufficient plasticization and has sufficient vapor pressure to produce acceptable insulating foams from polystyrene at commercial production rates. The ethylchloride provides additional plasticization to the molten styrenic resin and the propane lowers foam density. Other benefits of the invention will be addressed below.

SUMMARY OF THE INVENTION

Briefly, the invention provides a blowing agent useful for the production of styrenic foams which comprises ethylchloride, propane and at least one halogenated ethane selected from the group consisting of FC-142b, Freon 134a and Freon 124. Preferably, such a blowing agent system comprises about 60.0 to about 70.0 parts by weight halogenated ethane, about 20.0 to about 30.0 parts by weight ethyl chloride, and about 5.0 to about 20.0 parts by weight propane, per 100 parts by weight of the total of halogenated ethane, ethyl chloride and propane.

The invention also provides a method for use of the blowing agent composition which comprises foaming a mixture of a styrenic resin and the blowing agent composition of halogenated ethane, ethylchloride and propane to produce a styrenic foam. In a preferred embodiment of the method of the invention, the method comprises producing a styrenic foam by heating a styrenic resin in an extruder to produce a molten resin; introducing into the molten resin a blowing agent comprising at least one halogenated ethane selected from the group consisting of FC-142b, Freon 134a and Freon 124, ethylchloride and propane to produce a plasticized extrusion mass under a pressure sufficient to prevent foaming of the extrusion mass; and extruding the extrusion mass through a die into a zone having a temperature and pressure sufficient to permit foaming of the extrusion mass to produce the styrenic foam. In a more preferred embodiment of the invention, including the heating and cooung/foaming stage is controlled temperature at each stage of the extrusion process, within a range of ±two degrees F. around the desired temperature for each stage. In a still more preferred embodiment, a pair of parallel finishing plates is used as the shaping mechanism in the foaming stage of the extrusion process. The blowing agent composition and the method employing such a composition are particularly useful in the production of insulating polystyrene foams.

DESCRIPTION OF THE PREFERRED EMBODIMENTS

The blowing agent composition of the invention comprises three primary components: a halogenated ethane component selected from the group consisting of FC-142b, Freon 134a, Freon 124 and mixtures thereof; ethylchloride and propane. Preferably the blowing agent composition comprises about 60.0 to about 70.0 wt. % halogenated ethane component, about 20.0 to about 30.0 wt. % ethylchloride and about 5.0 to about 20.0 wt. % propane, based on the total weight of the three primary components of the blowing agent composition. On a styrenic resin basis the blowing agent composition thus preferably comprises about 0.5 to about 3.5 parts by weight propane for 100 parts by weight resin, about 2.5 to about 6.5 parts ethylchloride per 100 parts by weight resin and about 5.5 to about 12.0 parts of the halogenated ethane component per 100 parts by weight resin.

The blowing agent composition of the invention uses the halogenated ethane component to help meet the requirements of sufficient vapor pressure and melt plasticization. The halogenated ethane component is selected from the group consisting of Freon 134a, Freon 124, FC-142b and mixtures thereof and is selected as desired to vary or control system vapor pressure and plasticization. Freon 134a, Freon 124 and FC-142b are each ethanes, have at least one carbon atom fully halogenated, and have low or virtually no ozone reactivity. It is preferred to use FC-142b (with about 10 percent or less of the ozone reactivity of Freon 12) over Freon 134a (with virtually no ozone reactivity), only because Freon 134a is not now available in commercial quantities. Thus, preferably the blowing agent composition of the invention consists essentially of FC-142b, ethylchloride and propane. About 5.5 to about 12.0 parts of the halogenated ethane component per 100 parts by weight styrenic resin, is used because in amounts outside this range, the blowing agent does not produce acceptable insulating foam quality.

Ethylchloride is used in the blowing agent composition to provide additional resin plasticization in the extrusion process. It also permeates through polystyrene faster than the halogenated ethane or propane component, meaning it leaves the finished product quickly. However, it is preferred to minimize ethylchloride amount in the blowing agent composition to the minimum to achieve sufficient melt plasticization because if the melted resin becomes too plasticized, unstable foam may result. Thus, ethylchloride is preferably about 2.5 to about 6.5 parts by weight per 100 parts by weight of the resin.

The blowing agent composition of the invention advantageously uses propane to produce lower styrenic foam densities and also to reduce the amount of ethylchloride present in the finished foam product. Propane is less of a plasticizer for styrenic polymers than ethylchloride and has good vapor pressure. It is preferred to minimize the amount of ethylchloride in the blowing agent composition while increasing the amount of propane. However, I have found that the amount of propane in the blowing agent composition of the invention should not exceed about 3.5 parts per 100 parts resin; if this amount is exceeded, stable foam meeting governmental stability requirements is difficult to produce. The amount of propane should be above about 0.5 parts per 100 parts by weight resin, because in amounts below about 0.5 parts, the benefits of reduced foam density and ethylchloride concentration are difficult to achieve.

It is possible to add other components to the three primary components in the blowing agent mixture. For example, an aliphatic hydrocarbon other than propane, such as butane, can be added to replace partially the ethylchloride or propane. However, the other aliphatic hydrocarbons do not have a high enough vapor pressure difference from that of FC-142b to replace completely the ethylchloride or propane.

In the preparation of foams in accordance with the method of the invention, it is often desirable to add a nucleating agent to the styrenic resin. These nucleating agents serve primarily to increase cell count and reduce the cell size in the foam and are used in an amount of about one part by weight to about four parts by weight per one hundred parts resin. Improvements in the R-value of the foam can be achieved by adjusting nucleating agent content to increase cell count and reduce cell size. For example, talc, sodium bicarbonate, citric acid, calcium silicate and the like are suitable nucleating agents for reducing cell size. Talc is a preferred nucleating agent component in the practice of the method of the invention. Various other additives, for example fire retardant additives, may also be used depending on the end use of the styrenic foam.

The invention also comprises a method for producing an insulating styrenic foam having a thickness greater than about one-half inch, preferably using the blowing agent composition of the invention. In the method of the invention a styrenic foam is produced from a "styrenic resin," which herein means a solid polymer of one or more polymerizable alkenyl aromatic compounds or a mixture of such polymers. Such an alkenyl aromatic compound has the general formula:

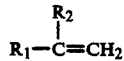

wherein $R_1$ represents an aromatic hydrocarbon radical, or an aromatic halohydrocarbon radical of the benzene or substituted benzene series, and $R_2$ is either hydrogen or the methyl radical. Examples of such alkenyl aromatic compounds are the solid homopolymer styrene, alpha-methyl styrene, ortho-methyl styrene, meta-methyl styrene, paramethyl styrene, the solid copolymers of one or more of such alkenyl aromatic compounds with amounts of other polymerizable compounds such as methylmethacrylate, acrylonitrile, maleic anhydride, acrylic acid and the like. A preferred styrenic resin is polystyrene which is readily available from various sources.

In the method of the invention, the styrenic resin is mixed with a blowing agent composition, such as FC-142b, ethylchloride and propane, and the resulting mixture is then foamed. Preferably the foaming is carried out with an extruder, wherein the styrenic polymer is heated to above its glass transition temperature (Tg) to produce a molten polymer and the blowing agent is then introduced into the extruder where it is mixed with the molten polymer under pressures such that the resulting plasticized extrusion mass does not foam. The extrusion mass is then extruded through a die of any desirable shape into a confined zone of controlled temperature and pressure which permits the extrusion mass to foam to produce the styrenic foam. It is also preferred that the die size, such as height and width of a slot die, and a shaping means or apparatus, used to accept the extrusion mass as it exits the die, be precisely matched to the final desired size of the foam. The resulting foam is then cooled in any suitable manner to produce any desired surface effect on the foam.

With the method of the invention, I have found that dimensional stability of high R-value, insulating styrenic foams can be achieved by what I call 'orientation balance'. This orientation balance recognizes that the dimensional stability of a styrenic foam is determined by the orientation of the styrenic polymer cell walls induced by all of the thermal and mechanical stresses placed on the molten styrenic polymer as it is extruded and cooled to below its glass transition temperature. Orientation balance, and, in turn, dimensional stability, is achieved by controlling: (a) die size and shape (height, width and thickness); (b) melt plasticization; (c) temperature, particularly in the foaming stage, and pressure; and (d) the mechanical stresses imparted onto the foam by the shaping apparatus, such as parallel finishing plates, used in the foaming stage to accept the molten resin as it exits the extrusion die.

The temperature and pressure conditions under which the styrenic resin and blowing agent composition mixture will not foam will depend upon the exact styrenic resin used and generally will be the conditions between about 240° F. at a pressure above about 1200 psi to a temperature about 440° F. at a pressure above about 1800 psi. The conditions of temperature and pressure under which the extrusion mass will foam, again will depend upon the precise styrenic resin used and generally will be any temperature and pressure combination outside the conditions in the previous sentence. However, the more precise the temperature is controlled throughout the extrusion process, the more uniform the resulting foam. In one embodiment the method of the invention therefore comprises controlling the temperature at each stage of the extrusion process to within ±2 degrees F of the desired temperature for each stage. It is critical to employ this temperature control in the foaming stage to obtain improved dimensional stability. The die is preferably slot shaped and has a cross sectional area of about 0.4 square inches to about 2.5 square inches, a height of about 0.015 inches to about 0.15 inches and a width of about 6.0 inches to about 30.0 inches. The melt plasticization is controlled by the choice of the blowing agent composition, the amount of and type of nucleating or other additives present, the particular styrenic resin or mixture being used and its Tg or Tg's and the temperature, pressure and extrusion rate. The shaping means used can also affect the orientation of the polymer. For example, as seen in Examples 7-9 below, a pair of cooled, 30 inch long finishing plates when held parallel above and below the resin as it exited the extruder, produced a more dimensionally stable foam, than when the plates were out of parallel by only ⅛ of an inch. For producing insulating foam boards, the finishing plates are thus preferably controlled in parallelism with one another to a tolerance of about 1.5 percent of the difference in distance between the plates at each plate end. By adjustment of the die shape, the shaping means and melt plasticization and by control of foaming temperature, the method of the invention produces dimensionally stable foams of R-value above about 5.0 per inch and meeting government requirements.

In the practice of the method of the invention, the blowing agent may be added to the styrenic resin in any desirable manner and preferably by injection of a stream comprising the three primary components of the blowing agent composition in the desired ratios directly into the molten styrenic resin in an extruder. When using the preferred tandem extruder discussed below, the blowing agent is injected into the resin at the end of the primary extruder section. The blowing agent should be mixed thoroughly with the styrenic resin before the blowing agent and styrenic resin extrusion mass is extruded through the die. This is necessary to produce a foam having uniform cross section.

The extrusion mass comprising the molten resin and the blowing agent composition is extruded into a confined foaming or expansion zone within which foam formation and expansion takes place. With appropriate extruder die or outlet modifications to achieve suitable confinement, any suitable extrusion equipment capable of processing polystyrenic compositions can be used for the extrusion. Single or multiple-screw extruders can be used, with a tandem extruder being preferred to maximize throughput. Softening the polymer and mixing with the blowing agent take place during working of the polymer between flights of the screw or screws which also serve to convey the extrusion mass to the extruder die. Screw speed and extruder barrel temperature should be such as to achieve adequate mixing and softening but not so high as to degrade the composition being processed.

In a preferred tandem extruder, the primary/melting extruder screw speeds range from about 80 rpm to about 120 rpm. At such screw speeds, barrel temperatures of about 100 to about 170° F. above Tg of the styrenic polymer generally are employed to heat the foamable composition to about 120 to about 150° F. above Tg. In the case of extrusion masses in which the polymer consists solely of polystyrene or impact polystyrene preferred for use according to this invention, the preferred barrel temperatures are about 325° F. to about 420° F. When the extrusion mass has multiple Tgs, heating is above the highest Tg of the composition.

In the preferred tandem extruder, the secondary/cooling extruder has a screw speed of about 8 to about 12 rpm and a barrel temperature in the range of about 100° F. near the secondary extruder inlet to about 220° F. near the extrusion die.

The plasticized, foamable extrusion mass is extruded into the confined foaming zone or stage in which expansion and cooling of the extrusion mass occur. The confined foaming zone establishes limits for expansion of the foamable composition in the plane normal to the direction of passage through the zone. To provide adequate space for expansion the area of the confined expansion zone in the plane normal to the direction of passage of extrudate through the zone is greater than the cross-section area of the orifice(s) in the extruder outlet from which the extrudate issues. Area of the confined expansion zone in such plane is not so great that the expanding foamable composition cools sufficiently to prevent further expansion prior to expanding to the boundary of the confined expansion zone. The confined zone is not restricted in the direction of travel of the expanded foamable composition and the process can be operated with continuous removal or take-off of the styrenic foam. For a given confined zone, control over foam densities is achieved by adjustment of take-off rates and extrusion rates as can be determined by persons skilled in the art by routine experimentation.

The configuration of the confined foaming zone in the plane normal to the direction of passage of extrudate is such that the expanding extrudate can expand essentially uniformly to the boundaries of the zone and be removed continuously therefrom. Accordingly, the confined foaming zone preferably is free of bends and constrictions and is of uniform cross-sectional area along its length. Preferably, to permit suitable expansion of extrudate issuing from the die and confinement of the expanding composition and consolidation thereof into a substantially uniform insulating board, foam heights in the confined foaming zone of about 0.50 inch to about 4.0 inches are employed.

Cooling of foamed extrudate to below Tg of the polymer (and below its lowest Tg in the case of extrusion of a mass with multiple Tgs) takes place in the confined zone as the composition expands to the boundaries of the confined zone. If desired, the confined zone can be heated to adjust the cooling rate or facilitate use of a larger forming die than otherwise would be suitable. The resulting, cooled, foamed extrudate is removed from the confined zone by any suitable means. The foaming zone, as noted above, can suitably be formed by a pair of parallel finishing plates maintained at the desired temperature.

The foams can be used in the form prepared, cut into other shapes, further shaped by application of heat and pressure or otherwise machined or formed into shaped articles of desired size and shape. The styrenic foams produced by the method of the invention have particular utility for insulating material as generally they will have R-values per inch above about 5. Foams prepared according to the invention are substantially closed-celled products having properties comparable to commercially available insulating styrenic foams. It is not preferred to use the styrenic foams produced by the method of the invention for any type of food contact application because of the presence of ethylchloride in the blowing agent composition.

The following examples are intended to illustrate the method and blowing agent of the invention, and should not be interpreted as limiting.

EXAMPLES 1-2

Two-inch thick polystyrene foam was produced using each of two blowing agent systems: a blowing agent composition of the invention, comprising 62.5 wt. % FC-142b, 22.5 wt. % ethylchloride (abbreviated as "EtCl" in all the following Tables) and 15.0 wt. % propane, based on total blowing agent weight, and a comparative system of Freon-12 and ethylchloride. One and one-half parts talc per 100 parts by weight polystyrene were mixed with the resin. The foams were produced on a National Rubber Machine 6-8, two screw tandem extruder, having the six-inch primary extruder section maintained at a temperature of 400° F. and a pressure of 1800 psi, and having the eight-inch secondary extruder section maintained at different temperatures along the secondary extruder, from the secondary extruder entrance to the extrusion die, respectively, of 130, 134, 146, 155, 164, and 184° F. Each of the blowing agent systems were injected into a polystyrene resin (Amoco Chemical Company R2) near the end of the primary extruder at a rate of 13.95 parts blowing agent per 100 parts by weight resin. The extrusion mass was extruded through a 27.5 inch wide and 0.045 inch high slot die at a rate of 1500 lbs. extrusion mass per hour into a two inch high foaming zone having a temperature of 190° F. and at atmospheric pressure to produce finished foam sheets. The temperature in the extruder sections and the foaming zone was controlled to ±2.0° F. by monitoring and adjusting as necessary the temperature of the sections and the finishing plates through which the foam sheets were fed. The resulting foams were then tested and the results are in Table 1. Each of the figures given is an average of the number of samples set out for each foam.

TABLE 1

|  | FC-142b/EtCl/ Propane | Comparative FC-12/EtCl |
|---|---|---|
| # of Samples Tested | 9 | 62 |
| Density (lb/ft$^3$) | 2.15 | 2.21 |
| Bromide Content (%) | 1.0 | 1.09 |
| Compressive Strength (psi) | 42.8$^a$ | — |
| Flexural Strength (psi | | |
| Machine Direction (MD) | 89.3 | — |
| Transverse Direction (TD) | 60.3 | — |
| Cell Count | | |
| MD | 200 | 229 |
| TD | 153 | 228 |
| Dimensional Stability (Max. %) | | |
| Length | 4.16 | 0.67 |
| Width | 3.43 | 3.76 |
| Thickness | 1.82 | 0.02 |
| R-Value (ft$^2$/hr/BTU) | | |
| Initial | 6.57 | 7.04 |
| 14 Days | 5.30 | 5.71 |
| 24 Days | 5.13 | 5.47 |
| 36 Days | 4.98 | 5.34 |
| 50 Days | 4.92 | 5.27 |

$^a$This compares to literature date of 41 psi for compressive strength of polystyrene foam.

The Density was determined by weighing and measuring a 5" × 5" sample of each sheet.
The Bromide Content was determined with an X-Ray Fluorescence Analyzer.
The Compressive Strength was determined by the procedure of ASTM D1621-73.
The Flexural Strength was determined by the procedure of ASTM C203.
The Cell Count was determined by microscopic analysis of the foam sheet.
The Dimensional Stability was measured after 36 days by the procedure of ASTM D2126-75.
The R-Value was measured at 75° F. by the procedure of ASTM C518-85.

The Density was determined by weighing and measuring a 5"×5" sample of each sheet.

The Bromide Content was determined with an X-Ray Fluorescence Analyzer.

The Compressive Strength was determined by the procedure of ASTM D1621-73.

The Flexural Strength was determined by the procedure of ASTM C203.

The Cell Count was determined by microscopic analysis of the foam sheet.

The Dimensional Stability was measured after 36 days by the procedure of ASTM D2126-75.

The R-Value was measured at 75° F. by the procedure of ASTM C518-85.

As seen in Table 1, the blowing agent composition of the invention produced a stable foam having an R-value of about 5.0 after 36 days aging.

EXAMPLES 3-7

Examples 3-7 demonstrate the method of the invention and the effect on dimensional stability of polystyrene foams of changes in the foam production process. In each of Examples 3-7, the extrusion was performed at the same melt temperature and pressure, the same finishing temperature, pressure and finishing plate configuration, the same talc nucleator concentration and the same extrusion rate with the extruder of Examples 1 and 2, and at comparable blowing agent concentrations. The foams in each Example were produced with a die lip of 21.6 inches and were two inches thick. Table 2 shows the changes in each Example.

TABLE 2

| Example | Resin | Blowing Agent | Flame Retardant |
|---|---|---|---|
| 3 | R2$^a$ | Freon 12/EtCl$^c$ | HBCD$^f$ |
| 4 | R2$^a$ | Freon 12/EtCl$^c$ | FM-836$^g$ |
| 5 | R2$^a$ | Freon 142b/EtCl$^d$ | FM-836$^g$ |
| 6 | R12$^b$ | Freon 142b/EtCl$^d$ | FM-836$^g$ |
| 7 | R2$^a$ | FC-142b/Butane$^e$ | Pyronil 45b$^h$ |

$^a$Polystyrene resin having a melt index of 2, available from Amoco Chemical Company
$^b$Polystyrene resin having a melt index of 12, available from Amoco Chemical Company
$^c$9.1 wt. % Freon 12/3.6 wt. % EtCl (wt. % on resin basis)
$^d$9.1 wt. % FC-142b/2.94 wt. % EtCl (wt. % on resin basis)
$^e$9.1 wt. % FC-142b/2.8 wt. % butane (wt. % on resin basis)
$^f$2 parts HBCD (hexabromocyclododecane) per 100 parts resin, available from Great Lakes Chemical
$^g$1.8 parts per 100 parts FM-836 resin, available from Great Lakes Chemical
$^h$2.8 parts per 100 parts resin, available from Pennwalt Corp.

The stability of each of the foams was tested by subjecting 4 inch by 4 inch samples, taken at four locations across the width of each board (locations 1 and 4 were at the sides of each board, respectively, and locations 2 and 3 were in between 1 and 4) after aging 26 days (Ex. 3) and 13 days (Ex. 4-7) from production date, to a temperature of 158° F. for 24 hours. The maximum percent change ("Max. % Chg") in the machine direction, transverse direction and height and the average of the maximum percent change ("Avg") for each of machine direction, transverse direction and height were determined and the results are in Table 3.

TABLE 3

| | | Location | | | | | |
|---|---|---|---|---|---|---|---|
| Ex | Max % Chg | 1 | 2 | 3 | 4 | Max | Avg |
| 3 | MD | 2.34 | (0.30) | (0.57) | 1.68 | 2.34 | 0.79 |
|  | TD | 0.62 | 2.55 | 3.33 | 0.95 | 3.33 | 1.86 |
|  | HT | 0.81 | 0.95 | 0.89 | 0.81 | 0.95 | 0.87 |
|  | Average | 1.26 | 1.07 | 1.21 | 1.15 | 2.20 | 1.17 |
| 4 | MD | 12.97 | 1.82 | 0.98 | 0.32 | 12.97 | 6.27 |
|  | TD | 4.46 | 12.63 | 11.87 | 5.91 | 12.63 | 8.72 |
|  | HT | 3.57 | 8.10 | 8.63 | 6.01 | 8.63 | 6.57 |
|  | Average | 7.00 | 7.52 | 7.16 | 7.08 | 11.41 | 7.19 |
| 5 | MD | 7.86 | 0.99 | 0.20 | 5.46 | 7.86 | 3.63 |
|  | TD | 10.79 | 15.70 | 15.63 | 11.12 | 15.70 | 13.31 |
|  | HT | 13.82 | 15.89 | 16.44 | 15.76 | 16.44 | 15.48 |
|  | Average | 10.82 | 10.86 | 10.76 | 10.78 | 13.33 | 10.80 |
| 6 | MD | 12.56 | 3.02 | 1.38 | 17.10 | 17.10 | 8.52 |
|  | TD | 11.65 | 16.88 | 18.57 | 7.84 | 18.57 | 13.73 |
|  | HT | 13.78 | 15.91 | 17.22 | 15.55 | 17.22 | 15.62 |
|  | Average | 12.66 | 11.94 | 12.39 | 13.50 | 17.63 | 12.62 |
| 7 | MD | 2.20 | (1.58) | 2.26 | 4.48 | 4.48 | 1.84 |
|  | TD | 12.67 | 15.46 | 13.29 | 8.10 | 15.46 | 12.38 |
|  | HT | 10.39 | 9.70 | (1.93) | 13.27 | 13.27 | 7.86 |
|  | Average | 8.42 | 7.86 | 4.54 | 8.62 | 11.07 | 7.36 |

Ex. 3 is a foam produced with a blowing agent of Freon 12/Ethylchloride. The difference between Ex. 3 and Ex. 4 is that Ex. 4 uses a different flame retardant which is a plasticizer for polystyrene resin. Ex. 4 was thus made from a more plasticized melt than Ex. 3. As seen in Table 3, Ex. 4 shows a decrease in stability in all dimensions compared to Ex. 3. Thus a change in melt plasticization can affect foam stability independent of blowing agent change.

Ex. 5 differs from Ex. 4 by the blowing agent. Ex. 5 exhibits more dimensional stability in the machine direction than Ex. 4, but less stability in the transverse direction and height. This comparison shows the blowing agent also affects foam stability.

Ex. 6 differs from Ex. 5 by use of a different resin, one with a 12 melt index. Ex. 6 showed similar dimensional stability in the transverse direction and height to Ex. 5, but also showed a decrease in machine direction stability. This comparison illustrates that the resin type can affect dimensional stability.

Ex. 7 differs from Ex. 6 through a switch to a less plasticizing blowing agent. Ex. 7 shows much better stability than Ex. 6 in all dimensions. In the comparisons of Ex. 1 to Ex. 2 and Ex. 6 to Ex. 7, the less plasticizing blowing agent system produced a more stable foam, irrespective of the blowing agent system used.

EXAMPLES 8-10

Examples 8-10 are dimensional studies on two inch thick foam insulation boards. Each of the foam boards in Ex. 8-10 were produced by extrusion with the extruder of Examples 1 and 2 through a die having a lip of 25.2 inches of a polystyrene resin having a melt index of 2, containing 1.0 parts talc per 100 parts resin and a Freon 12/Ethylchloride blowing agent mixture at the same blowing agent concentration, extrusion conditions and extrusion rate. The finishing plates at the exit from the die were thirty inches long. Table 4 sets out additional extrusion details.

TABLE 4

| Example | Blowing Agent Wt. % Freon 12/EtCl | Finishing Plates Temperature, °F. | Finishing Plates Parallel |
|---|---|---|---|
| 8 | 70/30 | 170 | No[a] |
| 9 | 72/28 | 190 | Yes[b] |
| 10 | 72/28 | 190 | No[a] |

[a]Distance between finishing plates was ⅛ inch smaller at the discharge end of the plates than at the inlet end near the extrusion die.
[b]Difference between distance between finishing plates at discharge and at inlet end less than 30 thousandths of an inch (less than 1.5%).

Two dimensional stability studies were done on the boards of Ex. 8-10. After twelve days of aging, 4"×4" samples of each board were taken from four locations across each board (as in Ex. 3-7), and these samples were subjected to 158° F. temperature for 24 hours. The dimensional change in the samples was then assessed. Table 5 sets out these test details.

After fifteen days of aging, a 6" diameter circular sample was taken from each board, and the circular samples were subjected to 230° F. for 5 minutes. The dimensional changes at four locations of each sample (locations were across a diameter, with two near each edge and two on the inside) were then assessed, and the details are in Table 6.

TABLE 5

| | | (4" × 4" Samples) | | | | | |
| | | Location | | | | | |
| Ex. | Max % Chg | 1 | 2 | 3 | 4 | Max | Avg |
|---|---|---|---|---|---|---|---|
| 3 | MD | 3.53 | 1.78 | 0.62 | 3.41 | 3.53 | 2.34 |
|   | TD | 0.18 | 1.00 | 1.54 | (0.45) | 1.54 | 0.57 |
|   | HT | 0.56 | 0.55 | 0.44 | 0.76 | 0.76 | 0.58 |
|   | Average | 1.42 | 1.11 | 0.87 | 1.24 | 1.94 | 1.16 |
| 9 | MD | 2.79 | (0.07) | 1.11 | (0.65) | 2.79 | 0.79 |
|   | TD | 0.39 | 1.76 | 0.91 | 2.22 | 2.22 | 1.32 |
|   | HT | 0.29 | 0.45 | 0.33 | 0.88 | 0.88 | 0.49 |
|   | Average | 1.16 | 0.71 | 0.79 | 0.82 | 1.96 | 0.87 |
| 10 | MD | (0.08) | (0.38) | (0.34) | (0.60) | (0.08) | (0.35) |
|   | TD | 2.22 | 2.79 | 3.38 | 3.03 | 3.38 | 2.86 |
|   | HT | 1.14 | 1.31 | 1.28 | 1.00 | 1.31 | 1.18 |
|   | Average | 1.09 | 1.24 | 1.44 | 1.14 | 1.54 | 1.23 |

TABLE 6

| | | (6" Diameter Samples) | | | | | |
| | | Location | | | | | |
| Ex. | Max % Chg | 1 | 2 | 3 | 4 | Max | Avg |
|---|---|---|---|---|---|---|---|
| 8 | MD | 15.78 | 8.61 | 8.57 | 15.09 | 15.78 | 12.01 |
|   | TD | 7.96 | 17.60 | 18.97 | 10.58 | 18.97 | 13.78 |
|   | HT | 13.69 | 16.00 | 17.05 | 15.97 | 17.05 | 15.68 |
|   | Average | 12.48 | 14.07 | 14.86 | 13.88 | 17.27 | 13.82 |
| 9 | MD | 14.03 | 3.16 | 3.52 | 15.49 | 15.49 | 9.05 |
|   | TD | 6.91 | 18.40 | 16.89 | 5.16 | 18.40 | 11.84 |
|   | HT | 16.43 | 17.32 | 18.11 | 16.01 | 18.11 | 16.97 |
|   | Average | 12.46 | 12.96 | 12.84 | 12.22 | 17.33 | 12.62 |
| 10 | MD | 12.61 | 3.07 | 4.76 | 15.36 | 15.36 | 8.95 |
|   | TD | 10.34 | 21.17 | 18.49 | 6.31 | 21.17 | 14.08 |
|   | HT | 16.75 | 18.82 | 20.12 | 13.12 | 20.12 | 17.20 |
|   | Average | 13.23 | 14.35 | 14.46 | 11.60 | 18.88 | 13.41 |

Reviewing the results in Table 5, one can see that Ex. 9 using the parallel finishing plates has better dimensional stability than Ex. 8 to 10 in all dimensions. A comparison of Ex. 8 and Ex. 10 shows Ex. 10, with a higher finishing plate temperature and a less plasticizing blowing agent (it contains 2 wt. % less EtCl) had better stability in the machine direction, but less stability in the transverse direction and the height.

A review of Table 6 shows again that Ex. 9 had better stability than either Ex. 8 or 10. The comparison of Ex. 8 to Ex. 10 is again similar to the results in Table 5: Ex. 10,s machine direction stability is better but its transverse direction and height stability is less than Ex. 8.

Examples 3-10 illustrate how changes in foam extrusion processing conditions can affect foam stability and how the method of the invention can be used to control the orientation balance of the foam board and achieve better dimensional stability.

EXAMPLES 11-13

Examples 11-13 were production and testing of foam insulation boards using the method of the invention to extrude a polystyrene resin having a melt index of 2. The extrusion conditions in each of Ex. 11-13 were identical, except for a change in the blowing agent, with Ex. 12 and 13 using the blowing agent composition of the invention. The extrusions were with the extruder of Examples 1 and 2 and through a die having a lip of 25.2 inches wide and used 30 inch long finishing plates at a temperature of 190° F. which were ⅛" tighter at the discharge end of the plate. Table 7 gives the test results, and the test methods used were the same as for Examples 1 and 2.

TABLE 7

| | Units | Ex. 11 Control F12/EtCl[a] | Ex. 12 142b/ EtCl Propane[b] | Ex. 13 142b/EtCl Higher % Propane[c] |
|---|---|---|---|---|
| Density | lb/ft$^3$ | 2.17 | 2.12 | 2.09 |
| Bromide Content | % | 1.37 | 1.43 | 1.36 |
| Compressive Strgth | psi | | | |
| Min. | | 50.4 | 45.3 | 46.0 |
| Max. | | 56.0 | 51.0 | 52.9 |
| Avg. | | 53.2 | 48.1 | 48.4 |
| S.D. | | 2.14 | 2.63 | 2.86 |
| Flexural Strength | psi | | | |
| Avg.-MD | | 64.1 | 85.4 | 71.9 |
| S.D. | | 7.06 | 8.53 | 10.1 |
| Avg.-TD | | 46.6 | 48.5 | 47.1 |
| S.D. | | 1.47 | 7.64 | 6.47 |
| Cell Count | | | | |
| MD | | 74 | 76 | 71 |
| TD | | 63 | 92 | 77 |
| AVG | | 69 | 84 | 74 |

TABLE 7-continued

|  | Units | Ex. 11 Control F12/EtCl[a] | Ex. 12 142b/ EtCl Propane[b] | Ex. 13 142b/EtCl Higher % Propane[c] |
|---|---|---|---|---|
| Cell Size |  |  |  |  |
| MD | mils | 8.1 | 7.4 | 8.9 |
| TD |  | 8.9 | 6.9 | 5.9 |

A review of the results in Table 7 shows comparable foams were produced in all of Ex. 11–13. However, the foam in Ex. 13, produced with a blowing agent of higher propane content, had lower density but lower R-value because of failure to provide higher cell count, such as by increasing nucleating agent amount. The blowing agent system of Ex. 13 is preferred to those with lower propane content.

A comparison of Example 12 to Examples 9 and 10 illustrates that the blowing agent system of the invention can produce insulating styrenic foams having excellent dimensional stability. Table 8 shows this comparison.

TABLE 8

| Ex. | Max. % Change, Avg. | | |
|---|---|---|---|
|  | MD | TD | HT |
| 9 | 0.79 | 1.32 | 0.49 |
| 10 | (0.35) | 2.86 | 1.81 |
| 12 | 0.66 | 2.76 | 0.93 |

The foam of Ex. 12 is essentially identical to that of Ex. 10 in stability and the difference in their production methods was the blowing agent. As noted above, the production difference between Ex. 9 and Ex. 10 was that Ex. 9 had parallel finishing plates.

Production of a styrenic foam using the extrusion conditions, specifically the parallel plates, of Ex. 9 and the blowing agent of Ex. 13, while increasing talc content, would result in a foam having excellent dimensional stability (less than a 2.0% maximum average change in any dimension). It will also be noted that the foams of Ex. 9, 10, 12 and 13 were all produced on commercial scale equipment and no scale-up problems were encountered in the method and blowing agent of the invention. The invention is capable of producing commercial insulating styrenic foams of high R-value.

It should be noted that the above is not intended to limit the scope of the invention, as various modifications may be made. Rather the invention's scope is set out by the following claims.

I claim:

1. A method of producing a styrene foam comprising: extruding and foaming a mixture of a styrene resin from the group consisting of polystyrene and copolymers of styrene with methyl methacrylate, acrylonitrile, maleic anhydride or acrylic acid, with a blowing agent comprising ethylchloride, propane and a halogenated ethane selected from the group consisting of 1,1,1-trifluoro-2-fluoroethane 1-chloro-1,1-difluoro-2,2,2-trifluoroethane, 1-chloro-1,1-difluoroethane and mixtures thereof wherein the blowing agent comprises about 0.5 to about 3.5 parts by weight propane per 100 parts by weight resin, about 2.5 to about 6.5 parts by weight ethyl chloride per 100 parts by weight resin and about 5.5 to about 12.0 parts by weight halogenated ethane per 100 parts by weight resin.

2. The method of claim 1 wherein the styrene resin is polystyrene, which is mixed with the blowing agent to create an extrusion mass at a temperature and pressure at which the resin is plasticized and the blowing agent is maintained it solution in the resin, and the extrusion mass is extruded into a foaming zone of controlled temperature and pressure to produce a polystyrene foam.

3. The method of claim 2 wherein the temperature of the foaming zone is controlled to a temperature of within two degrees F. of the desired temperature for foaming the styrenic resin.

4. The method of claim 1 wherein each of the halogenated ethane, the propane and the ethylchloride are added separately to the polystyrene resin.

5. The method of claim 1 wherein the halogenated ethane, the ethylchloride and the propane are combined and then added to the styrene resin.

6. The method of claim 1 wherein the styrene resin is selected from the group consisting of polystyrene and impact polystyrene.

7. A method for the production of a styrene foam comprising:
(a) heating a styrene resin from the group consisting of polystyrene and copolymers of styrene with methyl methacylate, acrylonitrile, maleic anhydride or acrylic acid, in an extruder to produce a molten resin;
(b) injecting into the molten resin a blowing agent comprising ethylchloride, propane and a halogenated ethane selected from the group consisting of 1chloro-1,1-difluoro-2,2,2trifluoroethane 1-chloro-1,1-difluoroethane and mixture thereof from the group consisting of polystyrene and copolymers of styrene with methyl methacylate, acrylonitrile, maleic anhydride or acrylic acid, to produce an extrusion mass under a pressure sufficient to prevent foaming of the extrusion mass;
(c) extruding the extrusion mass through a die into a zone having a temperature and pressure sufficient to permit expansion of the extrusion mass to produce the styrene foam.

8. The method of claim 7 wherein the styrene resin is polystyrene, impact polystyrene or mixtures thereof.

9. The method of claim 7 wherein the halogenated ethane is 1-chloro-1,1-difluoroethane.

* * * * *